United States Patent [19]
Barclay et al.

[11] Patent Number: 5,805,944
[45] Date of Patent: Sep. 8, 1998

[54] ALTERNATIVE CAMERA CARRY-STRAP AND LENS CAP

[75] Inventors: David Barclay, Bergen; James G. Rydelek, Henrietta, both of N.Y.

[73] Assignee: Eastman Kodak Company, Rochester, N.Y.

[21] Appl. No.: 816,372

[22] Filed: Mar. 13, 1997

[51] Int. Cl.[6] .................................................. G03B 29/00
[52] U.S. Cl. ........................ 396/422; 396/423; 359/511
[58] Field of Search ...................... 396/420, 422, 396/423, 424, 544; 359/511; 224/908

[56] References Cited

U.S. PATENT DOCUMENTS

| | | | |
|---|---|---|---|
| 2,291,821 | 8/1942 | McNabb | 359/511 |
| 4,327,960 | 5/1982 | Gould | 359/511 |
| 4,814,806 | 3/1989 | Flax | 396/544 |
| 5,115,264 | 5/1992 | Schappler | 396/423 |
| 5,175,576 | 12/1992 | Lancaster | 396/422 |

*Primary Examiner*—Howard B. Blankenship
*Attorney, Agent, or Firm*—Roger A. Fields

[57] ABSTRACT

A camera comprising a taking lens, and a carry-strap and associated lens cap attached to the camera. The carry-strap is configured to be looped around the camera in order to position the lens cap over the taking lens and, alternatively, to be extended as a loop from the camera in order to serve as a wrist or neck strap. Engageable means secures the carry-strap looped around the camera and as a loop extended from the camera.

3 Claims, 2 Drawing Sheets

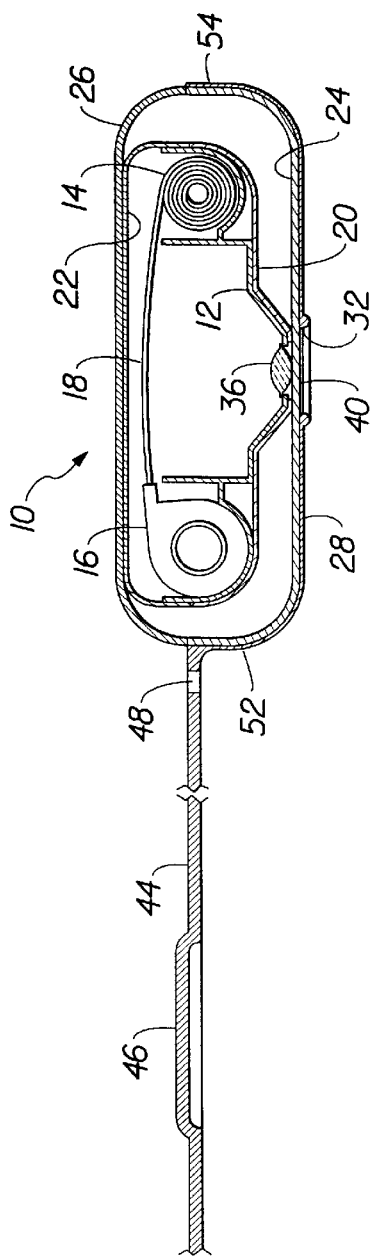
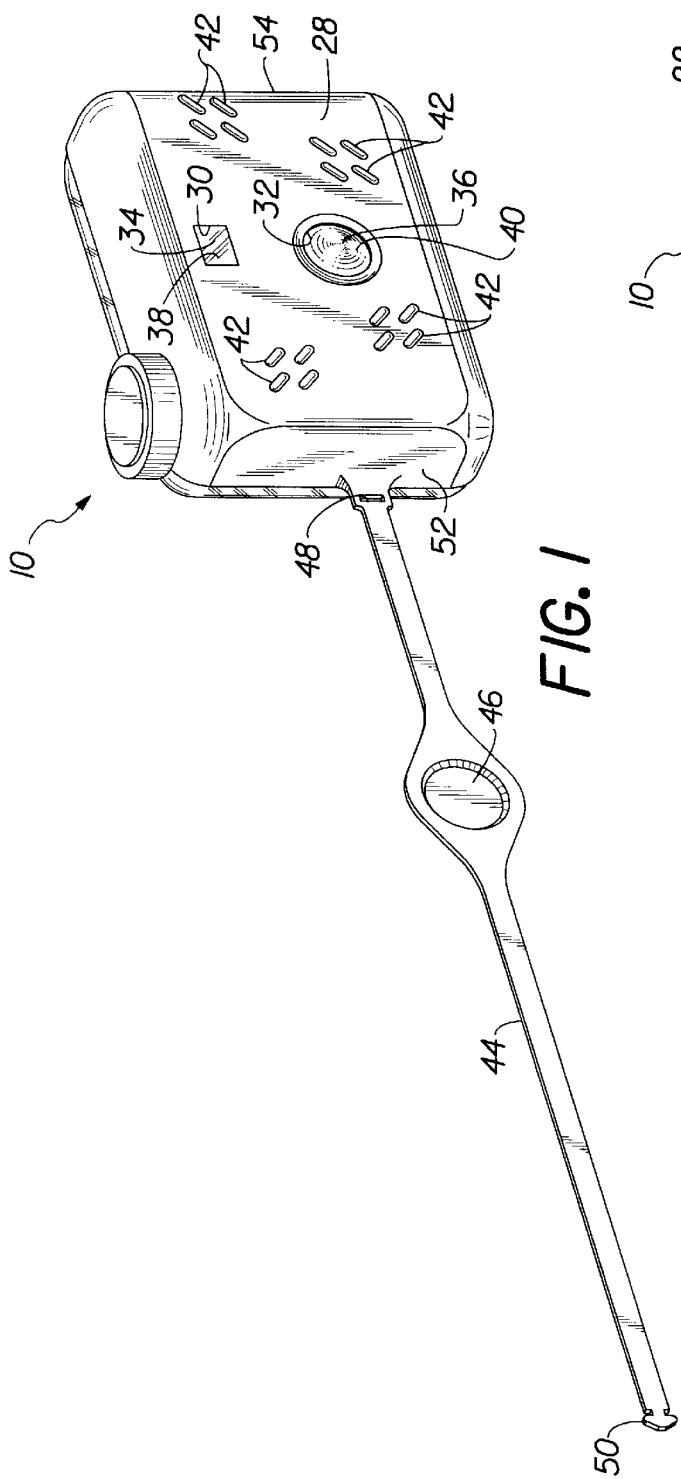

ALTERNATIVE CAMERA CARRY-STRAP AND LENS CAP

CROSS-REFERENCE TO RELATED APPLICATION

Reference is made to commonly assigned copending application Ser. No. 08/816,974, entitled CAMERA CASING INTEGRATED WITH CARRY-STRAP and filed Mar. 13, 1997 in the names of David Barclay, James G. Rydelek and Albert E. Rieger.

FIELD OF THE INVENTION

The invention relates generally to the field of photography, and in particular to a combination camera carry-strap and lens cap.

BACKGROUND OF THE INVENTION

It is well known for a camera to be provided with a flexible carry-strap. Typically, the carry-strap is secured to the camera via a lug to permit the carry-strap to extend as loop from the camera. The loop is sized to serve as a wrist or neck strap.

Also, prior art U.S. Pat. No. 2,291,821 issued Aug. 4, 1942 discloses a lens cap integrally formed with an elastic strap. One end of the elastic strap serves as a pull-handle to manually remove the lens cap from the taking lens of a camera and the other end of the elastic strap is attached to the camera around the taking lens.

THE CROSS-REFERENCE APPLICATION

The cross-referenced application discloses a camera casing provided with a flexible carry-strap which is secured to the camera casing to permit the carry-strap to extend as loop from the camera casing. An exterior elasticized overlay is arranged on the camera casing to serve as a ready hand grip for the camera casing and is integral with the carry-strap to make the carry strap similarly elasticized.

SUMMARY OF THE INVENTION

According to one aspect of the invention a camera comprising a taking lens, and a carry-strap and associated lens cap attached to the camera, is characterized in that:

the carry-strap is configured to be looped around the camera in order to position the lens cap over the taking lens and, alternatively, to be extended as a loop from the camera in order to serve as a wrist or neck strap; and engageable means secures the carry-strap looped around the camera and as a loop extended from the camera.

According to another aspect of the invention a carry-strap and associated lens cap to be attached to a camera, are characterized in that:

the carry-strap is configured to be looped around the camera in order to position the lens cap over a taking lens of the camera and, alternatively, to be extended as a loop from the camera, when the lens cap is removed from over the taking lens, in order for the carry-strap to serve as a wrist or neck strap.

BRIEF DESCRIPTION OF THE DRAWINGS

FIG. 1 is a front perspective view of a camera provided with a carry-strap and integral lens cap pursuant to a preferred embodiment of the invention, showing the carry-strap prior to being secured in a loop;

FIG. 2 is a sectional view of the camera and the carry-strap and integral lens cap as depicted in FIG. 1;

DETAILED DESCRIPTION OF THE INVENTION

The invention is disclosed as being embodied preferably in a water-resistant one-time-use camera. Because the features of a water-resistant one-time-use camera are generally known, the description which follows is directed in particular only to those elements forming part of or cooperating directly with the disclosed embodiment. It is to be understood, however, that other elements may take various forms known to a person of ordinary skill in the art.

PREFERRED EMBODIMENT

Figure 3:
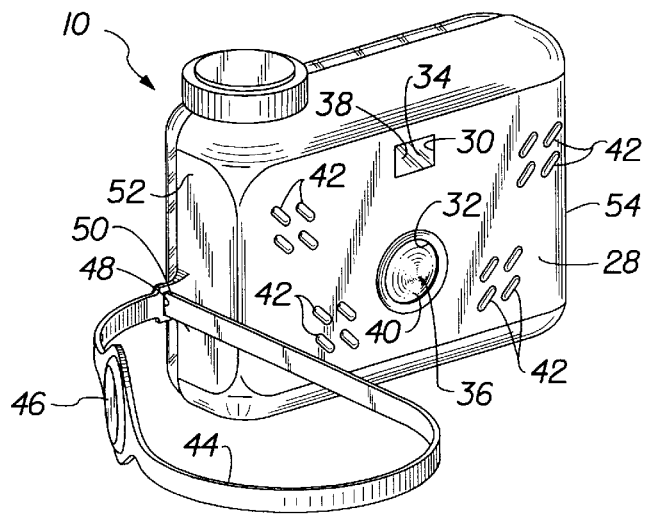
FIG. 3 is a front perspective view of the camera and the carry-strap and integral lens cap, showing the carry-strap extended as a loop from one end of the camera in order to serve as a wrist or neck strap.

Referring now to the drawings, FIGS. 1–3 show a water-resistant, plastic, one-time-use camera 10 comprising a main body part 12 holding an unexposed 35 mm film roll 14 and a light-trapping film cartridge 16 for receiving successively exposed frames of a filmstrip 18, a pair of opaque front and rear cover parts 20 and 22 which enclose the main body part, and a pair of transparent front and rear casing parts 24 and 26 which are heat-sealed together about the front and rear cover parts to form a water-resistant casing.

An exterior elasticized overlay 28, formed of rubber (or other elasticized water-impervious material) for example, is injection molded on the transparent front casing part 24 as shown in FIGS. 1 and 2. The exterior overlay 28 includes respective openings 30 and 32 for a front viewfinder window 34 and a taking lens 36 located behind individual portions 38 and 40 of the transparent front casing part 24, four sets of integral hand-grippable protuberances 42 and an integral carry-strap 44 and lens cap 46. The hand-grippable protuberances 42 and the carry-strap 44 and lens cap 46 are elasticized similar to the integral overlay 28.

Figure 4:
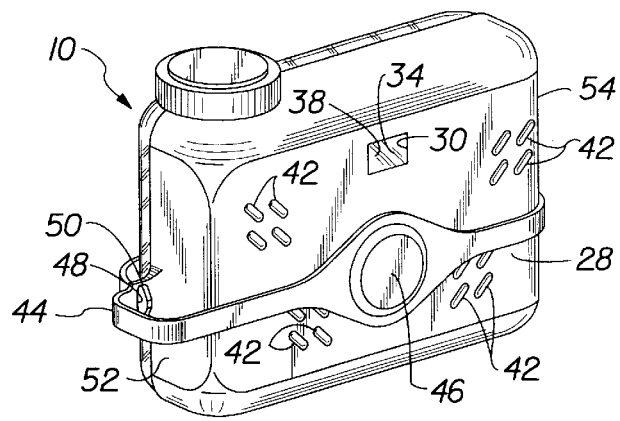
FIG. 4 is a front perspective view of the camera and the carry-strap and integral lens cap, showing the carry-strap looped completely around the camera with the lens cap positioned over the taking lens.

The carry-strap 44, as shown in FIGS. 1, 3 and 4, has a through-hole 48 relatively close to the transparent front casing part 24 and it has a notched, tapered, free end portion 50. The notched free end portion 50 is larger than the through-hole 48. This requires that the carry-strap 44 be momentarily stretched in the vicinity of the through-hole 48 to fit the notched free end portion 50 into the through-hole to engage the notched free end portion in the through-hole. When the notched free end portion 50 is fit into the through-hole 48 in one direction as shown in FIG. 4, the carry-strap 44 is looped completely around the transparent front casing part 24 and the transparent rear casing part 26, including opposite ends 52 and 54 of the transparent front casing part, and the lens cap 46 is positioned over the opening 32 in the exterior overlay 28 for the taking lens 36. Alternatively, when the notched free end portion 50 is fit into the through-hole 48 in a reverse direction as shown in FIG. 3, the carry-strap 44 is extended as a loop from the one end 52 of the transparent front casing part 24, and the lens cap 46 is removed from the opening 32 in the exterior overlay 28 for the taking lens 35. In this instance, the carry-strap 44 serves as a wrist or neck strap.

ALTERNATE EMBODIMENT

Figure 5:
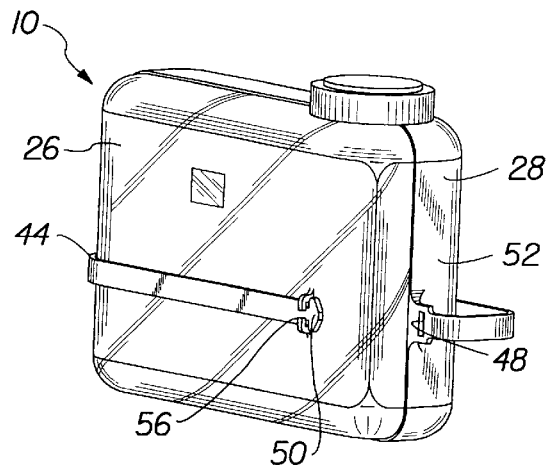
FIG. 5 is a rear front perspective view of the camera and the carry-strap and integral lens cap pursuant to an alternate embodiment of the invention, showing the showing the carry-strap looped partially around the camera with the lens cap positioned over the taking lens.

FIG. 5 shows a water-resistant one-time-use camera 10 which is substantially similar to the one in FIGS. 1–4 and thus, is provided with the same reference numbers as in FIGS. 1–4, except that the carry-strap 44 does not use the through-hole 48. Instead, an equivalent of the through-hole 48, i.e. a bracket 56, is provided on the transparent rear casing part 26 to engage the notched free end portion 50 of the carry-strap in order to maintain the carry-strap in a loop partially around the transparent front and rear casing parts 24 and 26 as shown in FIG. 5. In this instance, as in FIG. 4, the lens cap 46 is positioned over the opening 32 in the exterior overlay 28 for the taking lens 36.

The invention has been described with reference to a preferred embodiment. However, it will be appreciated that variations and modifications can be effected by a person of ordinary skill in the art without departing from the scope of the invention.

PARTS LIST 10. water-resistant one-time-use camera
12. main body part
14. unexposed film roll
16. film cartridge
18. filmstrip
20. front cover part
22. rear cover part
24. front casing part
26. rear casing part
28. exterior elasticized overlay
30. opening
32. opening
34. front viewfinder window
36. taking lens
38. casing portion
40. casing portion
42. hand-grippable protuberances
44. carry-strap
46. lens cap
48. through-hole
50. notched free end portion
52. end
54. end
56. bracket

We claim:

1. A camera comprising a taking lens, and a carry-strap and associated lens cap attached to said camera, is characterized in that:

said carry-strap is configured to be looped around said camera in order to position said lens cap over said taking lens and, alternatively, to be extended as a closed loop from the camera, with the lens cap not over the taking lens, in order to serve as a wrist or neck strap; and engageable means secures said carry-strap looped around said camera and, alternatively as said closed loop extended from the camera.

2. A camera as recited in claim 1, wherein said engageable means includes a pair of mating portions of said carry-strap at respective locations for engaging in one direction when the carry-strap is looped around the camera and for engaging in another direction when the carry-strap is extended as a closed loop from the camera.

3. A camera comprising a taking lens, and a carry-strap and associated lens cap attached to said camera, is characterized in that:

said carry-strap is configured to be looped around said camera, in order to position said lens cap over said taking lens and, alternatively, to be extended as a loop from the camera in order for the carry-strap to serve as a wrist or neck strap; and engageable means secures said carry-strap looped around said camera and as a loop extended from the camera, and includes a pair of mating portions of said carry-strap at respective locations for engaging in one direction when the carry-strap is looped around the camera and for engaging in another direction when the carry-strap is extended as a closed loop from the camera.

* * * * *